United States Patent [19]

Baker

[11] Patent Number: 4,501,297

[45] Date of Patent: Feb. 26, 1985

[54] ROTARY VALVE

[75] Inventor: Joseph Baker, Somerville, N.J.

[73] Assignee: Automatic Switch Company, Florham Park, N.J.

[21] Appl. No.: 366,728

[22] Filed: Apr. 8, 1982

[51] Int. Cl.³ .................. F16K 11/02; F16K 31/02; F16K 37/00

[52] U.S. Cl. .................. 137/625.46; 137/625.11; 137/554; 251/133; 251/180

[58] Field of Search .............. 137/625.11, 625.21, 137/625.46, 554; 251/133, 180, 185

[56] References Cited

U.S. PATENT DOCUMENTS

| | | | |
|---|---|---|---|
| 2,653,003 | 9/1953 | Overbeke | 137/625.21 |
| 2,832,561 | 4/1958 | Holl | 137/625.46 |
| 2,988,108 | 6/1961 | Malmquist et al. | 137/625.46 |
| 3,105,518 | 10/1963 | Kunz | 137/625.46 |
| 3,223,123 | 12/1965 | Young | 137/625.46 |
| 3,297,053 | 1/1967 | McKinney | 137/625.46 |
| 3,323,548 | 6/1967 | Ludwig | 251/133 |
| 3,556,151 | 1/1971 | Masuda | 137/625.21 |
| 3,633,623 | 1/1972 | Perry | 137/625.46 |
| 3,747,630 | 7/1973 | Hurrell | 137/625.46 |
| 3,875,967 | 4/1975 | de Fries | 137/625.21 |
| 3,990,476 | 11/1976 | Young et al. | 137/625.46 |
| 4,095,616 | 6/1978 | Krieger | 137/625.11 |
| 4,156,437 | 5/1979 | Chivens et al. | 137/554 |
| 4,299,251 | 11/1981 | Dugas | 137/554 |

Primary Examiner—Alan Cohan
Assistant Examiner—John A. Rivell
Attorney, Agent, or Firm—Alan H. Levine

[57] ABSTRACT

A rotary valve includes a rotor having at least one internal flow passageway therein extending between ports for providing communication between various pairs of flow passageways in the body of the valve. The rotor includes an annular surface for sealing engagement with the body, at least one of the rotor ports being disposed on the annular surface. A continuous resilient seal is disposed between the sealing surfaces of the rotor and the body to provide static and dynamic sealing. A spherical surface disposed between the rotary drive and the rotor applies axial pressure to the rotor, the surface accommodating rocking of the rotor to insure uniform loading thereof. Further, loading of the seal between the rotor and body is adjustable externally of the valve.

9 Claims, 11 Drawing Figures

ROTARY VALVE

DESCRIPTION

Technical Field

This invention relates to a rotary valve having a rotor with at least one internal flow passageway therein for providing communication between various pairs of flow passageways in the body of the valve.

BACKGROUND ART

Known rotary valves have included rotors with slots in a face thereof to provide communication between flow passageways in the body of the valve. Because a large separating force between the rotor and the body is created by fluid as it flows through the slots, a large force is required for sealing the rotor and the body to prevent leakage.

Typically, the rotor abuts directly against the body of the rotary valve. Misalignment of the rotor and the body can cause ununiform wear of the sealing surfaces therebetween. Due to irregularities in the sealing surfaces of the rotor and the body caused by wear, the surfaces do not exactly conform to one another resulting in leakage during both rotation of the rotor and while the rotor is stationary.

Known rotary valves typically include a stepper motor which rotates the rotor into alignment with various flow passageways of the body wherein positioning of the rotor is accomplished by monitoring the number of electrical drive pulses applied to the motor. This method does not provide positive positioning of the rotor with respect to the body of the valve and has been found to be unreliable.

DISCLOSURE OF THE INVENTION

The present invention is directed to overcoming one or more of the problems as set forth above.

The rotary valve of the present invention is compact and is particularly useful in directing small amounts of fluid to medical apparatus.

According to one aspect of the invention the rotary valve includes a rotor having at least one internal flow passageway therein extending between a pair of ports for providing communication between a pair of flow passageways in a body of the valve, the rotor having an outwardly extending annular surface for sealing engagement with the body and at least one of the internal flow passageway ports being disposed on the annular surface. The annular surface provides a small and precisely defined sealing surface between the rotor and the body so that with the application of a small axial force, a high unit load for sealing is achieved.

According to another aspect of the invention a continuous resilient seal is disposed between the sealing surfaces of the rotor and the body to provide static and dynamic sealing.

According to another aspect of the invention a spherical surface is provided for applying axial pressure to the rotor, the surface accommodating rocking of the rotor to insure uniform loading of the rotor and body sealing surfaces.

Another aspect of the invention is to provide an alignment means extending through the rotor and body of the valve along the axis of rotation to prevent misalignment and uniform wear of the sealing surfaces of the rotor and the body.

A further aspect of the invention is to provide externally adjustable seal loading.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

BEST MODE FOR CARRYING OUT THE INVENTION

Figure 1:
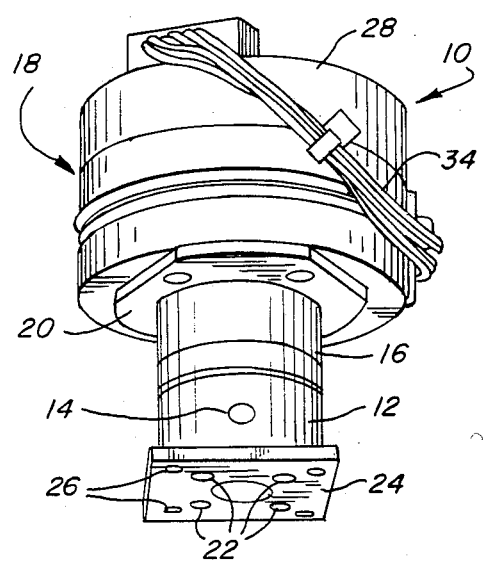
FIG. 1 is an elevational view of the rotary valve of the present invention.
Figure 2:
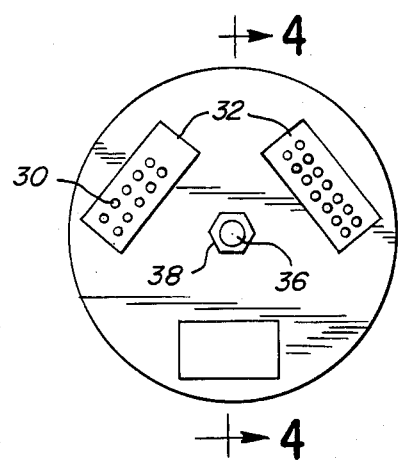
FIG. 2 is a top view of the rotary valve of FIG. 1.

A rotary valve 10 as shown in FIGS. 1 and 2, includes a cylindrically shaped body 12 having a number of internal flow passageways therein, each passageway extending between a port 14 disposed in the sidewall of the body and a port disposed in an upper surface of the body. A rotor, disposed within a housing 16, includes at least one internal flow passageway extending between ports disposed in a lower surface of the rotor to provide communication between various pairs of flow passageways in the body 12. The rotor is rotatably driven into alignment with various pairs of the flow passageways in the body by a stepper motor 18 secured to a mounting bracket 20. The body 12 and rotor housing 16 are secured to the motor 18 by four screws which extend through holes 22 in a mounting bracket 24 and through the body and rotor housing into the motor mounting bracket 20. The bracket 24 is also provided with threaded holes 26 for securing the rotary valve 10 to the apparatus in which it is to be employed.

The stepper motor 18 is electronically controlled by an integrated circuit to accurately position the rotor, the circuit being disposed beneath a cover 28 mounted on the motor. The circuit board includes terminals 30 which extend through apertures 32 in the cover 28 for connection with leads 34 from the motor 18. A screw 36 extends through the cover 28 to provide externally adjustable loading of the sealing surfaces between the rotor and the body 12 as discussed below. A nut 38 secures the cover 28 to the motor 18. The motor and circuit are not a part of the invention and are not disclosed in detail.

Figure 3A:
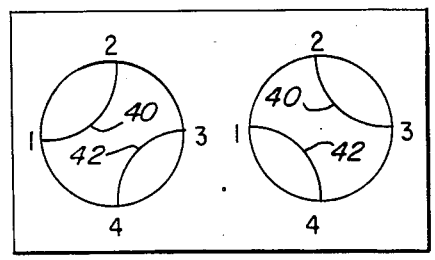
FIG. 3a illustrates the rotor flow passageway configuration for a four-way, two-position rotary valve.
Figure 3B:
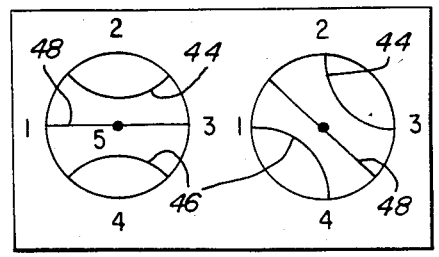
FIG. 3b illustrates the rotor flow passageway configuration for a five-way, two-position rotary valve.
Figure 3C:
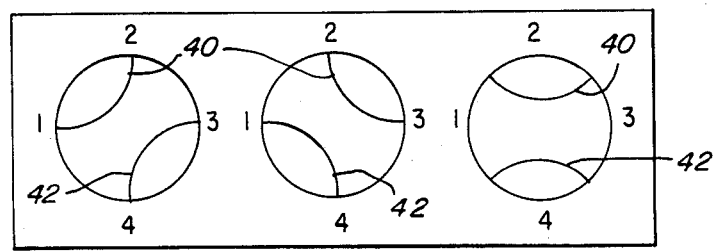
FIG. 3c illustrates the rotor flow passageway configuration for a four-way, three-position rotary valve.

FIGS. 3a–3d show various internal flow passageway configurations of the rotor for a body 12 having four flow passageways with ports in the upper surface of the body disposed at 90° intervals about a circumference of a circle, the ports being designated by the numerals 1, 2, 3 and 4. FIG. 3a is illustrative of a four-way, two-position rotary valve having two arcuate internal flow passageways 40 and 42 extending through the rotor to provide communication between adjacent pairs of ports in the body 12. In a first position, the flow passageway 40 provides communication between ports 1 and 2 of the body, the flow passageway 42 providing communication between ports 3 and 4. By rotating the rotor 90° to a second position, the flow passageway 40 provides communication between ports 2 and 3 of the body while the flow passageway 42 provides communication between ports 1 and 4. FIG. 3c is illustrative of a four-way, three-position rotary valve having the same rotor configuration as shown in FIG. 3a. By rotating the rotor 45° to a third position between the first and second positions, none of the flow passageways of the body 12 are in communication.

Figure 3D:
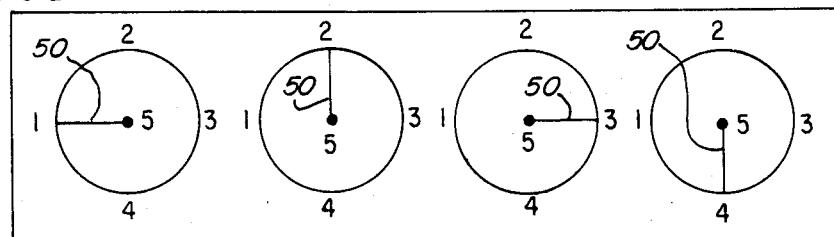
FIG. 3d illustrates the rotor flow passageway configuration for a five-way, four-position rotary valve.

FIG. 3b is illustrative of a five-way, two-position rotary valve for a body having a fifth flow passageway extending to a central port 5 disposed along the axis of rotation of the valve. The rotor includes three internal flow passageways, two arcuate flow passageways 44 and 46 for providing communication between adjacent pairs of ports in the body and a flow passageway 48 extending across the diameter of the rotor for providing communication between the central port and a pair of opposite ports. In a first position, the flow passageway 48 provides communication between ports 1, 3 and 5 of the body. By rotating the rotor 45° to a second position, the flow passageway 44 provides communication between ports 2 and 3 while the flow passageway 46 provides communication between ports 1 and 4. FIG. 3d is illustrative of a five-way, four-position rotary valve for a rotor having a single internal flow passageway 50 and for a body having five ports, 1, 2, 3, 4 and 5 similar to that shown in FIG. 3d. By rotating the rotor 90°, the central port 5 may be placed in communication with each of the ports 1, 2, 3 and 4.

Figure 4:
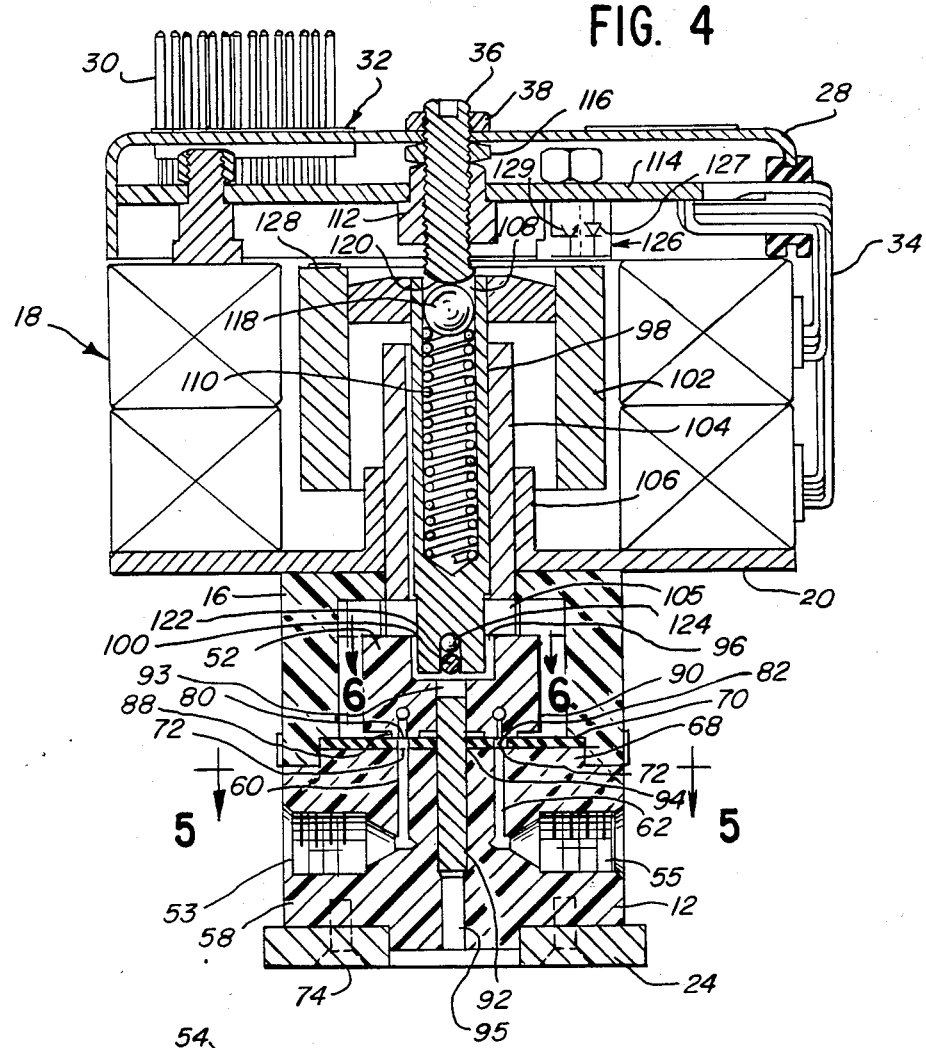
FIG. 4 is a sectional side view of the rotary valve taken along line 4—4 in FIG. 2.
Figure 5:
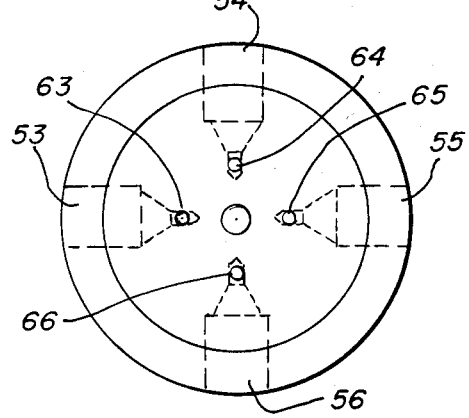
FIG. 5 is a sectional top view of the body of the valve taken along line 5—5 of FIG. 4.

FIG. 4 shows a rotary valve 10 having a rotor 52 with the internal flow passageway configuration shown in FIGS. 3a and 3c. As shown in FIGS. 4 and 5, the rotary valve 10 includes a cylindrically shaped body 12 which may be molded of plastic having four threaded ports 53, 54, 55 and 56 disposed at 90° intervals about a sidewall 58 of the body. Each of the threaded ports has a tapered end 59 leading to a flow passageway, such as the passageways 60 and 62 shown for ports 53 and 55 respectively. Each of the flow passageways extends between an associated port 53, 54, 55, and 56 in the sidewall of the body and a respective port 63, 64, 65 and 66 disposed in an upper surface 68 of the body at 90° intervals about a circumference of a circle centered about the axis of rotation.

A continuous circular seal 70 made of a resilient material is disposed between the body 12 and the rotor 52 to provide static and dynamic sealing. The seal 70 includes four holes 72 disposed at 90° intervals and positioned for alignment with port 63, 64, 65 and 66 disposed in the upper surface 68 of the body. The holes 72 of the seal are held in alignment with the ports of the upper surface of the body by means of four screws 74, only two of which are shown, the screws extending through the mounting bracket 24, the body 12 and the seal 70 into the rotor housing 16 and the motor mounting bracket 20.

Figure 6:
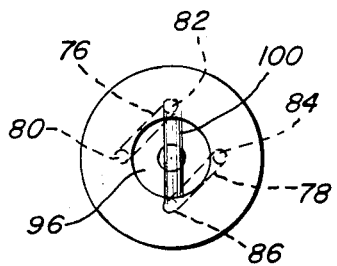
FIG. 6 is a top view of the rotor shown in FIG. 5.

The cylindrically shaped rotor 52 as shown in FIGS. 4 and 6 may be molded of plastic having two internal flow passageways 76 and 78 as shown in FIGS. 3a and 3c for providing communication between adjacent pairs of ports in the upper surface 68 of the body 12. The internal flow passageways 76 and 78 extend between a respective pair of adjacent ports 80, 82 and 84, 86 disposed at 90° intervals about a sealing surface 88 of the rotor and positioned for alignment with the ports in the upper surface 68 of the body 12 and the holes 72 of the seal 70.

The sealing surface 88 of the rotor 52 is an outwardly extending annular surface having an inner diameter which is slightly less than the diameter of the circle on which the ports 63-66 are disposed and an outer diameter which is slightly greater than the diameter of the circle, the width of the surface 88 being sufficiently great to accommodate the ports disposed therein. The annular surface 88 provides a small and precisely defined sealing surface between the rotor 52 and the body 12 so that with the application of a small axial force as discussed below, a high unit load for sealing is achieved.

The rotor 52, body 12 and seal 70 are held in alignment about the axis of rotation by an alignment pin 92 which extends through apertures 93, 94 and 95 formed along the center axis line of the rotor, seal and body respectively. The alignment pin insures exact axial positioning of the ports in the sealing surfaces of the rotor 52 and the body 12 and of the holes 72 in the seal 70 and prevents misalignment which could cause ununiform seal wear and leakage.

The aperture 93 extends through the rotor 52 to an aperture 96 having a larger diameter for accommodating a drive shaft 98. A drive pin 100 is disposed within the aperture 96 along a diameter of the rotor 52, the drive pin being engaged by the drive shaft 98 as discussed below to impart rotation to the rotor.

The rotor 52 is rotatably driven to various positions by the stepper motor 18 having an armature 102 mounted on the drive shaft 98 which engages the rotor. The drive shaft 98 extends through a sleeve 104 into the rotor housing 16, the sleeve 104 being secured to an annular flange 106 extending upwardly from the motor mounting bracket 20.

The drive shaft 98 includes an aperture 108 along the axis of rotation and in which a spring 110 is placed for urging the rotor into sealing engagement with the body 12. The spring 110 is loaded by the externally adjustable screw 36 which extends through the cover 28 into a threaded insert 112 disposed in an aperture of a circuit board 114, a nut 116 abutting the insert. A ball 118 is disposed between the spring 110 and the adjusting screw 36 having a spherical surface 120, the ball 118 and surface 120 providing a point contact therebetween for loading the spring along the axis of rotation.

The drive shaft 98 further includes a slot 122 extending along a diameter of the shaft at its lower end, the slot 122 accommodating the drive pin 100 of the rotor 52. The spherical surface of a ball 124 located on the axis of rotation in the slot 122, applies axial pressure to the drive pin 100 while allowing the rotor to rock in any direction during rotation to insure uniform loading of the seal.

The motor 18 is electronically controlled to accurately position the rotor 52 with respect to the ports in the upper surface 68 of the body by an integrated circuit disposed on the board 114 which is mounted on the motor 18 by bolts 116 and 120. Positive positioning is achieved by sensing the rotor position with sensors such as the sensor 126 mounted on the underside of the circuit board 114 and a reflector 128 which may be made of aluminum foil or the like mounted directly on the armature 102 of the motor. The sensor 126 includes a light emitting diode 127 which emits radiation. The radiation, when reflected back by the reflector 128, actuates a photo transistor 129 to signal the accurate positioning of the rotor terminating rotation. A sensor 126 is provided for each of the rotor positions. Each of the sensors is mounted on the circuit board 114 such that it will be directly above the reflector 128 when the rotor is in the position associated with that sensor.

Figure 7:
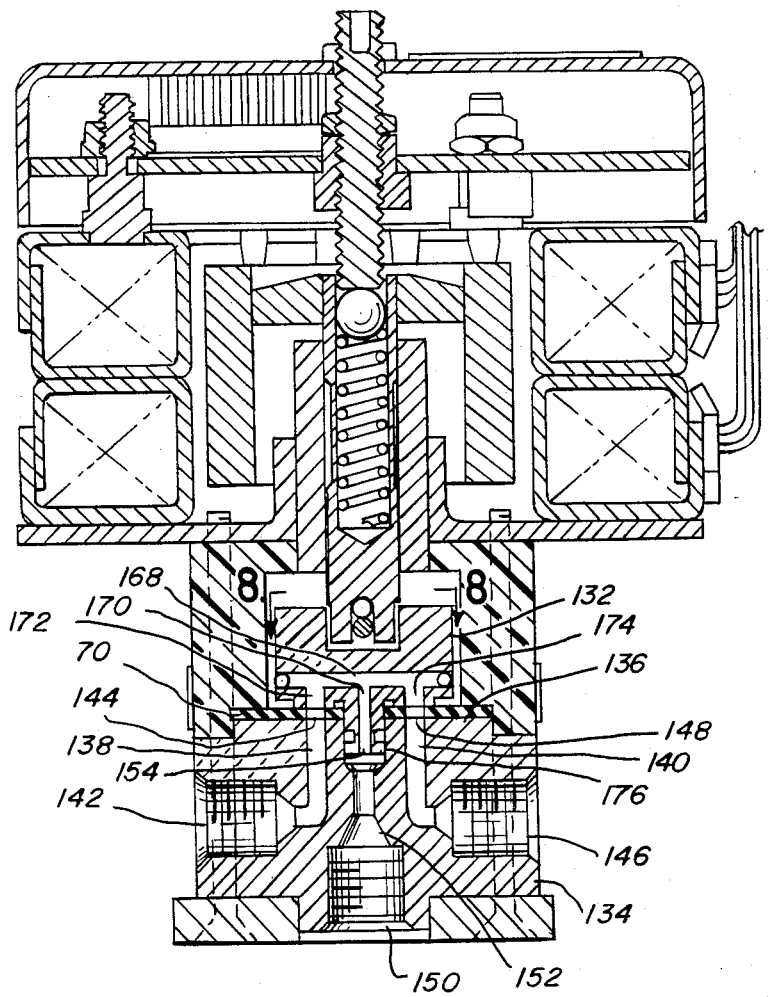
FIG. 7 is a sectional view of a modified rotary valve.

FIG. 7 shows a rotary valve 130 having a rotor 132 and a body 134 with a flow passageway configuration as illustrated in FIGS. 3b and 3d, the rotor drive being the same as discussed with reference to FIG. 4. The body 134 includes four internal flow passageways extending between threaded ports disposed in the sidewall of the body and ports disposed in an upper surface 136 at 90° intervals about a circumference of a circle centered about the axis of rotation, only two of the flow passageways 138 and 140 being shown extending between respective pairs of ports 142, 144 and 146, 148. The body also includes a threaded port 150 disposed along the axis of rotation and extending to a transfer tube 152 for providing a central port 154.

Figure 8:
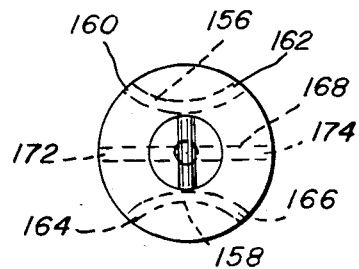
FIG. 8 is a top view of the rotor shown in FIG. 7.

The rotor 132 as shown in FIGS. 7 and 8 includes three internal flow passageways, two arcuate flow passageways 156 and 158 extending between respective pairs of adjacent ports 160, 162 and 164, 166 in the annular sealing surface 88 of the rotor and a flow passageway 168 extending along a diameter of the rotor between a central port 170 and a pair of opposite ports 172 and 174.

The rotor 132 includes a downwardly extending sleeve 176 through which the central port 170 extends, the sleeve 176 extending through the body 134 in sealing engagement with the port 154 of the transfer tube 152. The sleeve 176 functions in the same manner as the alignment pin 92 shown in FIG. 4 to maintain the body 134, the seal 70 and the rotor 132 in axial alignment.

The rotor 132 of FIGS. 7 and 8 is shown for a rotary valve having the flow passageway configuration illustrated in FIG. 3b. The rotor 132 may be modified, however, to provide the flow passageway configuration illustrated in FIG. 3d by inserting plugs into ports 160, 162, 164 and 166 of the rotor and also providing a plug extending from the sidewall of the rotor through the central passageway 168 covering the port 174 but leaving the central passageway 168 covering the port 174 but leaving the central port 170 open. It is further noted that the rotor 132 may also be modified for use in a rotary valve having the flow passageway configurations of FIGS. 3a and 3c by plugging the ports 170, 172 and 174 so that only the two arcuate flow passageways 156 and 158 remain.

INDUSTRIAL APPLICABILITY

In operation, the motor 18 rotates the rotor 52, 132 into position as determined by the sensor 126 so that the ports in the sealing surface 88 of the rotor are aligned with ports in the upper surface 68 of the body. During rotation, the rotor 52, seal 70 and body 12 are maintained in axial alignment by the pin 92 as shown in FIG. 4, the rotor 132 being maintained in axial alignment with the seal 70 and the body 134 by the sleeve 176 as shown in FIG. 7. The exact alignment of the rotor, seal and body provided by the alignment pin 92 and the sleeve 176 prevents ununiform wear of the sealing surfaces which can result in leakage.

During rotation, several features of the rotary valve contribute to low torque. The axial force created by the spring 110 positioned in the drive shaft 98 along the axis of rotation is counteracted by the ball 118 which, because of the point contact between the ball and the spherical surface 120 of the screw 36 on the axis of rotation, has little if any moment contributing to torque. Low torque is further achieved by the narrow and precisely defined annular sealing surface 88 of the rotor which requires little spring force to effect a good seal. The spring force required for sealing the body and the rotor is further minimized by the use of the internal flow passageways in the rotor 52 which reduce the separating force between the body and the rotor.

Positive static and dynamic sealing is provided by the continuous resilient seal 70 disposed between the body 12 and the rotor 52. The seal 70 compensates for minute irregularities in the sealing surface 68 of the body and the sealing surface of the rotor to prevent leakage during rotation and while the rotor is stationary. Because the seal 70 is continuous over the upper surface 68 of the body, sealing is provided when the rotor is between positions so that none of the passageways of the body are in communication. The continuous seal 70 further prevents cross flow during rotation of the rotor and also guards against contaminant buildup on the otherwise exposed rotor surfaces.

Sealing is further enhanced by the ball 124 located in the slot 122 of the drive shaft 98, the ball transmitting the spring force to the drive pin 100 of the rotor. The ball 124 insures uniform loading of the seal by allowing the rotor to rock in any direction during rotation so that the sealing surfaces of the rotor, seal and body conform exactly to one another.

The externally adjustable seal loading provided by the screw 36 extending through the cover 28 of the rotary valve allows easy adjustment of the spring force required for different pressures and port sizes. The adjusting screw 36 also eliminates the need for maintaining close tolerances which are otherwise required to provide a consistent spring force.

Other aspects, objects and advantages of the invention can be obtained from a study of the drawings, the disclosure and the appended claims.

I claim:

1. In a rotary valve including a body having a plurality of flow passageways therein, a rotor for providing communication between at least one pair of said flow passageways and drive means for rotating said rotor into alignment with various pairs of flow passageways, the improvement wherein:

said body includes a plurality of ports disposed in a surface of the body along a circumference of a circle, each of said ports leading to an associated flow passageway within said body;

said rotor includes at least one internal flow passageway extending between a pair of ports for providing communication between a pair of flow passageways in the body, said rotor having an annular surface for sealing engagement with said surface of the body, at least one of the internal flow passageway ports being disposed on said annular surface;

a rotating member for engaging the rotor to impart rotation thereto;

and a stationary member for applying an axial force to the rotor along the axis of rotation for sealing the annular surface of the rotor and the surface of the body, said stationary member having an axial bearing surface which contacts an axial bearing surface of said rotating member at a point substantially on the axis of rotation, each of said axial bearing surfaces being substantially spherical.

2. In a rotary valve including a body having a plurality of flow passageways therein, a rotor for providing communication between at least one of said flow passageways and drive means for rotating said rotor into alignment with various pairs of flow passageways, the improvement wherein:

said body includes a plurality of ports disposed in a surface of the body along a circumference of a circle, each of said ports leading to an associated flow passageway within said body;

said rotor includes at least one internal flow passageway extending between a pair of ports for providing communication between a pair of flow passageways in the body, said rotor having an annular surface for sealing engagement with said surface of the body, at least one of the internal flow passageway ports being disposed on said annular surface; and said drive means includes a drive shaft having a lower end for engagement with the rotor, said drive shaft having an aperture therein extending along the axial center line of the shaft;

a rotating spring disposed within the aperture of said drive shaft for urging the rotor against the body of the valve;

a stationary means for loading said spring; and a rotating ball disposed between said loading means and said spring for counteracting the force created by the spring, said loading means having a substantially spherical surface providing a point contact with said ball along the axis of rotation.

3. In a rotary valve including a body having a plurality of flow passageways therein, a rotor for providing communication between at least one pair of said flow passageways and drive means for rotating said rotor into alignment with various pairs of the flow passageways, the improvement wherein:

said body includes a plurality of ports disposed in a surface of the body, each of said ports leading to an associated flow passageway within the body;

said rotor includes a drive pin extending along a diameter thereof and at least one internal flow passageway for providing communication between a pair of flow passageways of the body, the internal flow passageway having a pair of ports disposed in a surface of said rotor for sealing engagement with said surface of the body, said ports being positioned for alignment with various ports in the surface of the body; and said drive means includes a slot for receiving the drive pin with a ball being disposed in said slot on the axis of rotation, said ball bearing against said drive pin.

4. In a rotary valve including a body having a plurality of flow passageways therein, a rotor for providing communication between at least one pair of said flow passageways and drive means for rotating said rotor into alignment with various pairs of the flow passageways, the improvement wherein:

said body includes a plurality of ports disposed in a surface of the body, each of said ports leading to an associated flow passageway within the body;

said rotor includes at least one internal flow passageway for providing communication between a pair of flow passageways of the body, the internal flow passageway having a pair of ports disposed in a surface of said rotor for sealing engagement with said surface of the body, said ports being positioned for alignment with various ports in the surface of the body; and means for applying an axial force to said rotor for sealing the rotor surface and the body surface, said means including a spring disposed along the axis of rotation, a screw having a spherical surface and a ball disposed along the axis of rotation between the spring and the spherical surface of the screw.

5. In a rotary valve including a body having a plurality of flow passageways therein, a rotor for providing communication between at least one pair of said flow passageways, said rotor being in sealing engagement with said body and drive means for rotating said rotor into alignment with various pairs of the flow passageways, the improvement wherein said drive means includes a rotating member for engaging the rotor to impart rotation thereto, said rotating member having a substantially spherical surface and said rotor having a substantially cylindrical surface, the spherical surface of said rotating member contacting the cylindrical surface of said rotor for accommodating rocking of the rotor; and a stationary member for applying an axial force to said rotor along the axis of rotation for sealing the rotor and the body.

6. The rotary valve of claim 5 wherein said stationary member has a spherical surface for providing a point contact with said rotating member along the axis of rotation.

7. The rotary valve of claim 6 wherein said rotating member includes a drive shaft having an aperture therein extending along the axis of rotation and a spring disposed within said aperture, said stationary member loading said spring.

8. The rotary valve of claim 7 further including a ball disposed along the axis of rotation between the spring and the stationary member.

9. The rotary valve of claim 7 wherein said rotor includes a drive pin extending along a diameter of the rotor and said drive shaft includes a slot in an end thereof for receiving the drive pin with a ball being disposed in said slot on the axis of rotation, said ball bearing against said drive pin.

* * * * *